US007039630B2

(12) United States Patent
Shimazu

(10) Patent No.: US 7,039,630 B2
(45) Date of Patent: May 2, 2006

(54) INFORMATION SEARCH/PRESENTATION SYSTEM

(75) Inventor: Hideo Shimazu, Tokyo (JP)

(73) Assignee: NEC Corporation, Tokyo (JP)

( * ) Notice: Subject to any disclaimer, the term of this patent is extended or adjusted under 35 U.S.C. 154(b) by 398 days.

(21) Appl. No.: 09/910,779

(22) Filed: Jul. 24, 2001

(65) Prior Publication Data

US 2002/0059207 A1    May 16, 2002

(30) Foreign Application Priority Data

Jul. 27, 2000    (JP)    .............................. 2000-226835

(51) Int. Cl.
 *G06F 17/30* (2006.01)
(52) U.S. Cl. ...................................... 707/3; 707/104.1
(58) Field of Classification Search .................. 707/10, 707/3, 104.1, 102; 345/305, 350, 355; 701/200, 701/207–208; 382/113
See application file for complete search history.

(56) References Cited

U.S. PATENT DOCUMENTS

| 5,115,399 | A  * | 5/1992  | Nimura et al. ............... 701/208 |
| 5,850,352 | A  * | 12/1998 | Moezzi et al. ............... 345/419 |
| 5,945,976 | A  * | 8/1999  | Iwamura et al. ............. 345/419 |
| 5,945,985 | A  * | 8/1999  | Babin et al. ............. 715/500.1 |
| 5,956,028 | A  * | 9/1999  | Matsui et al. ................ 345/757 |
| 6,094,649 | A  * | 7/2000  | Bowen et al. ................... 707/3 |
| 6,178,377 | B1 * | 1/2001  | Ishihara et al. ............. 701/200 |
| 6,199,045 | B1 * | 3/2001  | Giniger et al. .................. 705/1 |
| 6,307,573 | B1 * | 10/2001 | Barros ........................ 345/764 |
| 6,385,541 | B1 * | 5/2002  | Blumberg et al. .......... 701/213 |
| 6,408,307 | B1 * | 6/2002  | Semple et al. ........... 707/104.1 |
| 6,437,778 | B1 * | 8/2002  | Matsui et al. ................ 345/419 |

(Continued)

FOREIGN PATENT DOCUMENTS

EP    822502 A1 *   2/1998

OTHER PUBLICATIONS

Poole, et al. "Distributed Communication Methods and Role-based Access Control for Use in Health Care Applications: 2.3 SQL/RDA", Aug. 4, 1999. http://hissa.ncsl.nist.gov/rbac/poole/ir5820/ir5820s23.htm.*

(Continued)

*Primary Examiner*—Kim Vu
*Assistant Examiner*—Thomas Gyorfi
(74) *Attorney, Agent, or Firm*—Foley & Lardner LLP

(57) ABSTRACT

An information search/presentation system includes a 3D image converter, landmark database, search engine, and 3D image browser. The 3D image converter outputs 3D image data on the basis of aerial photographs obtained by photographing a single area from different places, with the physical position of the area being specified. The landmark database stores a pair of a verbal expression and position information as a unit record the verbal expression pertaining to the name and contents of a landmark existing in the photographed area. The search engine outputs link information for page data including associated contents from a set of page data on public view in response to an input keyword. The 3D image browser creates a 3D stereoscopic image viewed from a viewpoint position designated by a user on the basis of the 3D image data and the viewpoint position, and presents the image to the user. The browser also looks up the database in accordance with an associated information presentation request associated with the position designated by the user. If a landmark corresponding to the designated position exists, the browser outputs to the search engine a verbal expression pertaining to the name and contents of the corresponding landmark as a keyword to present a search result.

8 Claims, 8 Drawing Sheets

U.S. PATENT DOCUMENTS

| | | | |
|---|---|---|---|
| 6,442,479 B1 * | 8/2002 | Barton | 701/213 |
| 6,477,526 B1 * | 11/2002 | Hayashi et al. | 707/4 |
| 6,487,495 B1 * | 11/2002 | Gale et al. | 701/209 |
| 6,496,776 B1 * | 12/2002 | Blumberg et al. | 701/213 |
| 6,526,335 B1 * | 2/2003 | Treyz et al. | 701/1 |
| 6,577,714 B1 * | 6/2003 | Darcie et al. | 379/93.17 |
| 6,587,784 B1 * | 7/2003 | Okude et al. | 701/208 |
| 6,633,763 B1 * | 10/2003 | Yoshioka | 455/457 |
| 6,708,184 B1 * | 3/2004 | Smith et al. | 707/104.1 |
| 2001/0003815 A1 * | 6/2001 | Nakano | 707/1 |
| 2001/0034661 A1 * | 10/2001 | Ferreira | 705/26 |
| 2002/0026289 A1 * | 2/2002 | Kuzunuki et al. | 702/150 |
| 2002/0059296 A1 * | 5/2002 | Hayashi et al. | 707/104.1 |
| 2002/0068585 A1 * | 6/2002 | Chan et al. | 455/456 |
| 2002/0154171 A1 * | 10/2002 | Lee et al. | 345/781 |

OTHER PUBLICATIONS

Baillard et al.; "Segmentation of Urban Scene from Aerial Stereo Imagery", Proceedings of International Conference of Pattern Recognition; 1998; pp. 1404-1407.

Ficher et al.; "Extracting Buildings from Aerial Images Using Hierarchical Aggregation in 2D and 3D"; Computer Vision and Image Understanding; Academic Press, vol. 72, No. 2; Nov. 1998; pp. 185-197.

Gabet et al.; "Automatic Generation of High Resolution Urban Zone Digital Elevation Models"; ISPRS Journal of Photogrammetry & Remote Sensing; Elsevier Science; vol. 52; 1997; pp. 33-47.

* cited by examiner

INFORMATION SEARCH/PRESENTATION SYSTEM

BACKGROUND OF THE INVENTION

The present invention relates to an information search/presentation system for providing a 3D stereoscopic image at a point desired by a user and information about landmarks in the image.

General methods of performing Web page search on the WWW (Word Wide Web) and page search based on portable telephone information providing services include a method of sequentially selecting menus created in advance and tracing links to destination pages. A characteristic feature of these search methods is that pages are independently searched out regardless of physical positions. If, for example, a user searches for information about flower shops, hit pages about flower shops in Tokyo, Paris, New York, and the like are presented regardless of the positions at which they actually exist.

The above search method is convenient when locations are insignificant. If, however, a user is standing in front of a station X in Tokyo and wants to find a nearby flower shop, he/she requires only pages about flower shops near the station. In this case, the conventional search method, by which even pages about flower shops in Paris and New York are searched out, is inconvenient.

A method of solving this problem has been proposed, in which when 2D map information is presented to a user, and the user designates a certain place on the presented map, shop information is presented by automatically tracing a link to the shop information located at the designated place. Such a method is generally available and includes, for example, a method in which when a country map is presented to a user and the user designates a certain prefecture in the presented map, a jump is made to information about the prefecture.

For example, on the home page of the French Government Tourist Office, when a user clicks a certain prefecture in a displayed map of France with a mouse, a jump is made to information about the prefecture. This method can be easily implemented on the Web by using a clickable map technique, and hence is frequently used. Japanese Patent Laid-Open No. 9-34902 discloses an advertisement information providing system for providing information at a link destination as advertisement information, which is applied to a 2D map.

The following problems are posed in the method of accepting an input from a user upon presentation of 2D map information. First, it takes considerable effort to update map information. In an urban area, in particular, reconstruction of buildings, construction of new roads, and the like are often made. It requires tremendous work to maintain and update corresponding map information so as to quickly reflect the above situations in the map information. Second, a search for information from a map is convenient as a search operation, but is not fun for a user. This is because a search from a map is cumbersome operation like a search for a station on a route from a timetable.

SUMMARY OF THE INVENTION

It is an object of the present invention to provide an information search/presentation system which can reduce the work load required to maintain and update map information.

It is another object of the present invention to provide an information search/presentation system which can provide visual effects that allow a user to enjoy using the system.

In order to achieve the above objects, according to the present invention, there is provided an information search/presentation system comprising a 3D image converter for outputting 3D image data on the basis of a plurality of aerial photographs obtained by photographing a single area from different places, with a physical position of the area being specified, a first database for storing a pair of a verbal expression and position information as a unit record, the verbal expression pertaining to a name and contents of a landmark existing in the area photographed to obtain the aerial photographs, a search engine for outputting link information for page data including associated contents from a set of page data on public view in response to an input keyword, and an 3D image browser for creating a 3D stereoscopic image viewed from a viewpoint position designated by a user on the basis of the 3D image data from the 3D image converter and the viewpoint position, presenting the image to the user, looking up the first database in accordance with an associated information presentation request associated with the position designated by the user, and, if a landmark corresponding to the designated position exists, outputting to the search engine a verbal expression pertaining to a name and contents of the corresponding landmark as a keyword to present a search result obtained by the search engine.

DESCRIPTION OF THE PREFERRED EMBODIMENTS

The embodiments of the present invention will be described below with reference to the accompanying drawings.

Figure 1:
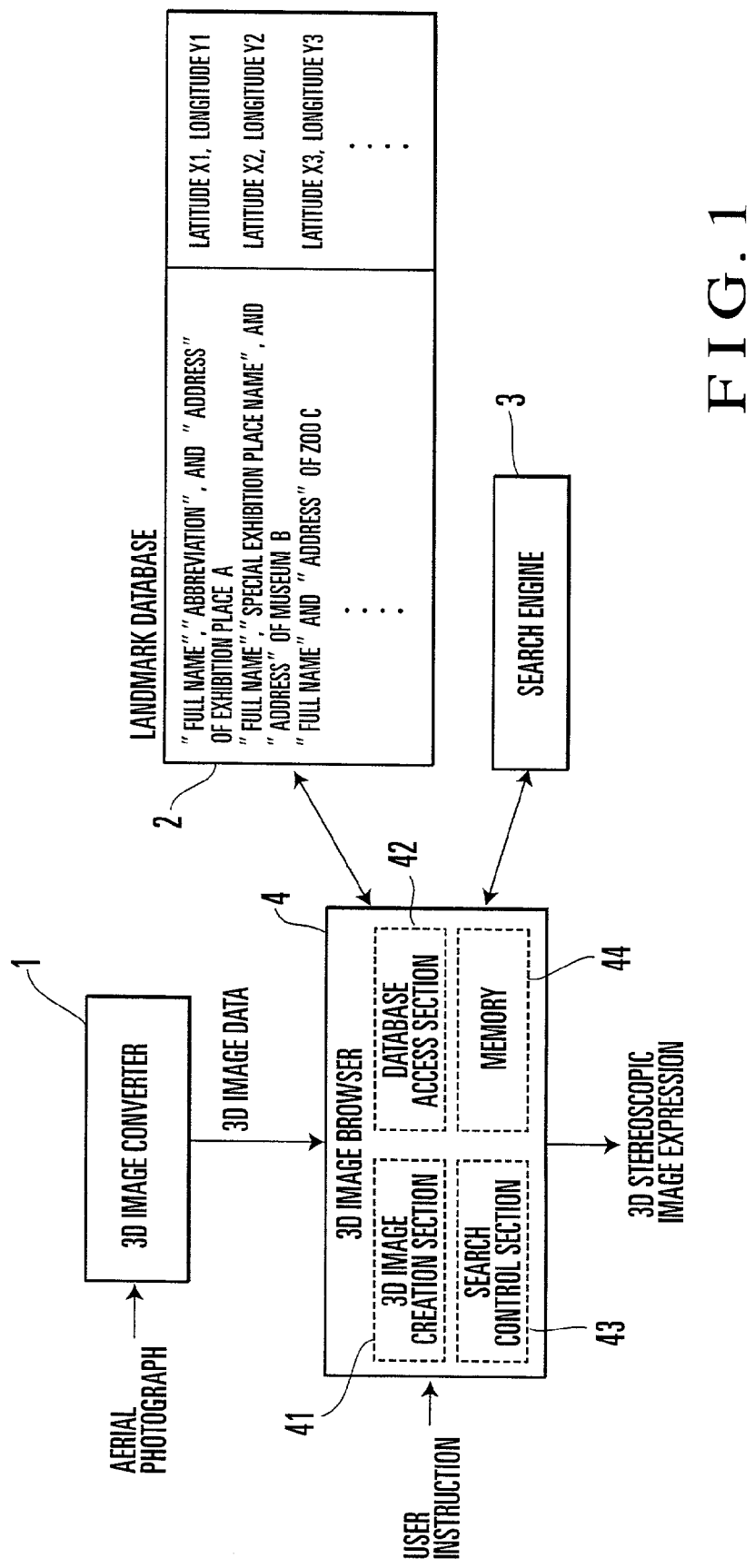
FIG. 1 is a block diagram showing an information search/presentation system according to the first embodiment of the present invention.

FIG. 1 shows an information search/presentation system according to the first embodiment of the present invention. The information search/presentation system according to this embodiment is comprised of a 3D image converter 1 for inputting aerial photographs, a landmark database 2 in which information about the positions of landmarks is stored, a search engine 3 for searching for link information in accordance with keywords, and a 3D image browser 4 for outputting a 3D stereoscopic image expression, accessing the landmark database 2, and outputting the search result obtained by the search engine 3 on the basis of the 3D image data output from the 3D image converter 1 and input information (a viewpoint position and information presentation instruction) from a user.

The 3D image converter 1 receives a plurality of aerial photographs obtained by photographing a single area from different places, with the physical position of the area being specified, converts these photographs into 3D image data by a stereo process, and outputs the data. As a method for this stereo process, a known technique, for example, the technique disclosed in "Segmentation of Urban Scene from Aerial Stereo Imagery", Proceedings of International Conference of Pattern Recognition, pp. 1404–1407, 1998 (reference 1) or "Extracting Buildings from Aerial Images Using Hierarchical Aggregation in 2D and 3D", Computer Vision and Image Understanding, Vol. 72, No. 2, pp. 185–203, November 1998 (reference 2) can be used, and hence a description thereof will be omitted.

The landmark database 2 is a database in which a pair of position information and a verbal expression pertaining to the name and contents of each landmark (sign) existing in an area photographed as aerial photographs are stored as a unit record. As a verbal expression, a keyword sequence that the search engine 3 can input is used. As a latitude/longitude expression, a 2D array expression that the 3D image browser 4 can accept is used. A storage medium serving as the landmark database 2 may take a relational database form or general file form, and is not specifically limited.

When the user inputs a keyword sequence, the search engine 3 returns link information for page data including information associated with the input keyword sequence from a set of page data on public view like the WWW or the like. In the case of the WWW, widely used search engines (e.g., "Altavista" and "Infoseek") may be used. In the case of a portable telephone information providing service, a search engine dedicated to the service can be used.

The 3D image browser 4 includes a 3D image creation section 41 for creating a 3D stereoscopic image viewed from a specific viewpoint position input by the user on the basis of the 3D image data output from the 3D image converter 1 and the viewpoint position, and presenting the image to the user, a database access section 42 for looking up the landmark database 2 upon reception of a request to present information associated with a specific position on a 3D stereoscopic image from the user, a search control section 43 for, when it is determined on the basis of the access result that there is a landmark corresponding to the specific position, transferring a verbal expression pertaining to the name and contents of the corresponding landmark to the search engine 3, receiving the search result from the search engine 3, and presenting it to the user, and a memory 44 for storing the 3D image data from the 3D image converter 1.

Figure 4:
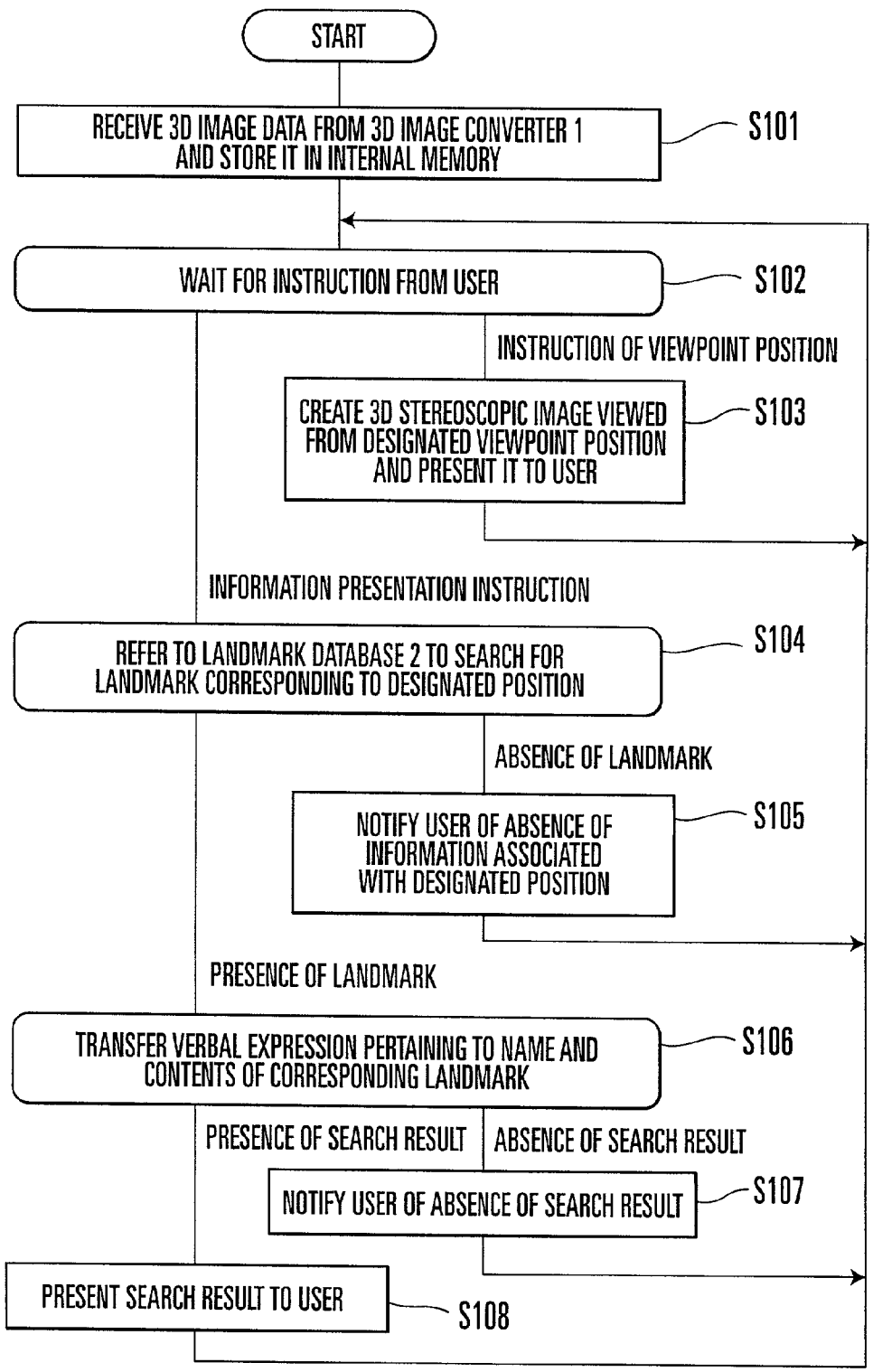
FIG. 4 is a flow chart showing the processing performed by a 3D image browser in FIG. 1.

FIG. 4 shows the flow of processing performed by the 3D image browser 4. The 3D image browser 4 receives 3D image data from the 3D image converter 1 and stores it in the memory 44 (step S101). The flow then shifts to the step of waiting for an instruction from the user (step S102). Upon receiving a specific viewpoint position from the user, the 3D image creation section 41 creates a 3D stereoscopic image viewed from the viewpoint position and presents it to the user (step S103). After the presentation, the flow returns to step S102 to wait for an instruction from the user.

If it is determined in step S102 that the user has generated a request to present information about a designated position in the 3D stereoscopic image, the database access section 42 looks up the landmark database 2 to check whether there is a landmark corresponding to the designated position (step S104). If no landmark is present, the user is notified that there is no information associated with the designated position (step S105). The flow then returns to step S102.

If there is a landmark, the search control section 43 transfers a verbal expression pertaining to the name and contents of the corresponding landmark to the search engine 3 (step S106). The search engine 3 performs search operation by using the received verbal expression pertaining to the name and contents of the landmark as a keyword. For example, one of the typical search engines on the WWW returns link information of a home page on the WWW which is associated with the received verbal expression, as a search result, to the search control section 43.

If no search result is obtained by the search engine 3, the search control section 43 notifies the user of the corresponding information (step S107), and the flow returns to step S102. If a search result is obtained, the search control section 43 presents the search result to the user (step S108), and the flow returns to step S102. As described above, if a search result is obtained, the 3D image browser 4 presents link information of a home page as the search result to the user.

The above processing in steps S104 and S105 will be described in more detail. Assume that the user is now doing aerial sight-seeing on the screen displaying the 3D stereoscopic image, and wonders, over a zoo C, "what is this structure?; it looks like a park". In this case, the user requests the 3D image browser 4 to present information associated with this position. In accordance with this request, the 3D image browser 4 checks the latitude and longitude of the designated position. The 3D image browser 4 then looks up the landmark database 2 in accordance with the latitude and longitude of the designated position to check whether there is a record including the position represented by the latitude and longitude. If there is no corresponding record, the 3D image browser 4 notifies the user of information indicating "there is no associated information". If a corresponding record is present but no landmark is present in the record, the 3D image browser 4 notifies the user of information indicating that there is no associated landmark.

The schematic operation of the information search/presentation system in FIG. 1 will be described next with reference to FIGS. 5 to 7. First of all, a single area is photographed periodically, e.g., on a weekly basis, by using an airplane or satellite. In this case, such a photograph will be referred to as an aerial photograph. For example, aerial photographs taken by the Space Imaging's "IKONOS" satellite can be purchased at a cost of several thousand yen per kilometer square (monochrome). Since "IKONOS" can photograph the entire earth, a latest aerial photograph of the surface of the earth can be purchased on a weekly basis. Since accurate latitude/longitude information is attached to such an aerial photograph, a specific photographed site can be accurately known.

Figure 5:
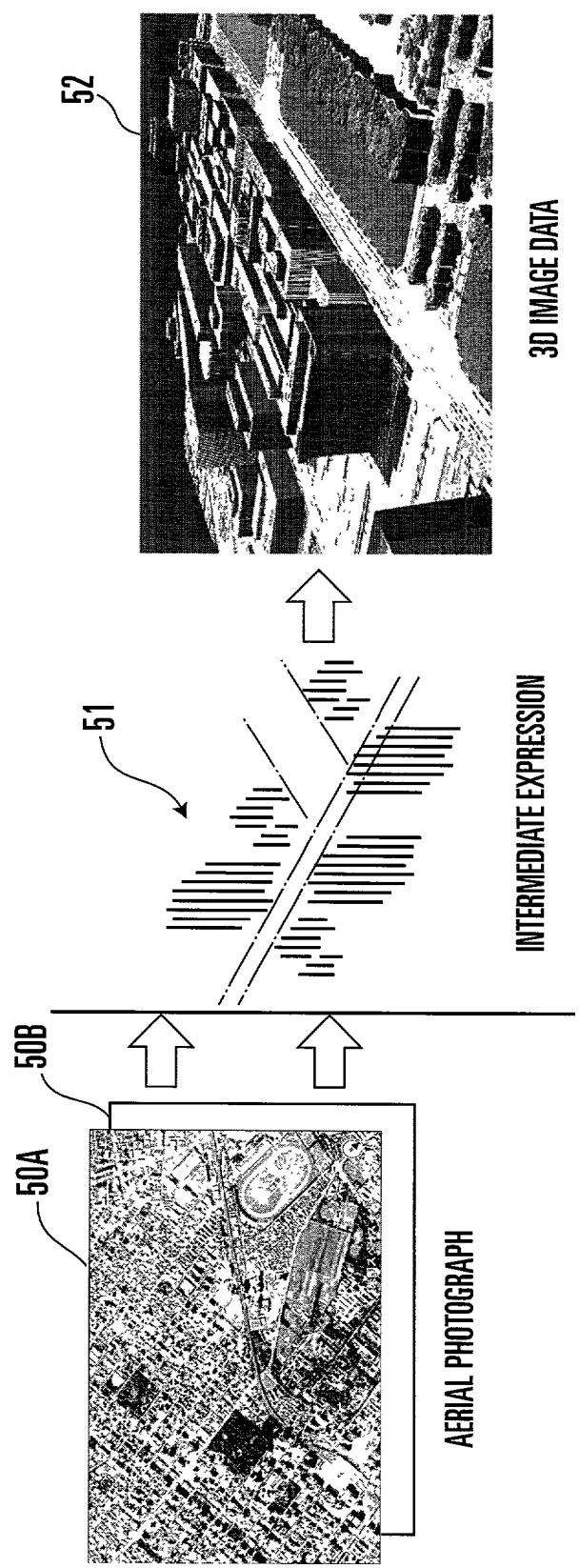
FIG. 5 is a view for explaining the schematic operation of the information search/presentation system in FIG. 1.

As shown in FIG. 5, a stereo process is performed for two aerial photographs 50A and 50B obtained by photographing a single area from different angles, and calculations in the height direction, e.g., calculations for buildings and mountains, are performed on the basis of the differences between the two photographs. In the stereo process, information indicating which is a building and which is a mountain cannot be extracted from aerial photographs. In the stereo process, only height information at a unit point can be calculated. For example, with photographs taken by an airplane capable of low-altitude flight, height calculations can be made on the surface of the earth on a 25-cm square basis. With photographs taken by "IKONOS", height calculations can be made on the surface of the earth on a 1-m square basis because the photographs are taken at much higher altitudes.

With this processing, an intermediate expression 51 like a hedgehog is obtained. A case where height information is calculated on a 1-m square basis will be described. Consider a building with a height of 30 m in a 20-m square area. A height of 30 m is calculated at 400 (20×20) points within the building area. If a level ground surrounds the building, a height of 0 m is calculated at points other than those in the building area. According to the rule "continuation of points at the same height indicates one building", it can be estimated that a building exists in this 20×20 area. This is a series of operations in the stereo process.

The stereo process performed by the 3D image converter 1 is an established technique, as disclosed in reference 1. The present invention may use some proper existing stereo process for the creation of 3D image data, and is not limited to any specific stereo process. In addition, in the present invention, the 3D image converter 1 is described as a constituting element for performing a stereo process, but will not be described in more detail. When the stereo process is performed, so-called landmarks such as a building and mountain are extracted. In the present invention, such data will be referred to as 3D image data 52. Since accurate position information about a reference point in an aerial photograph is attached to the photograph, position information about each landmark can be easily calculated from the distances from the reference points on the x- and y-axes.

Figure 6:
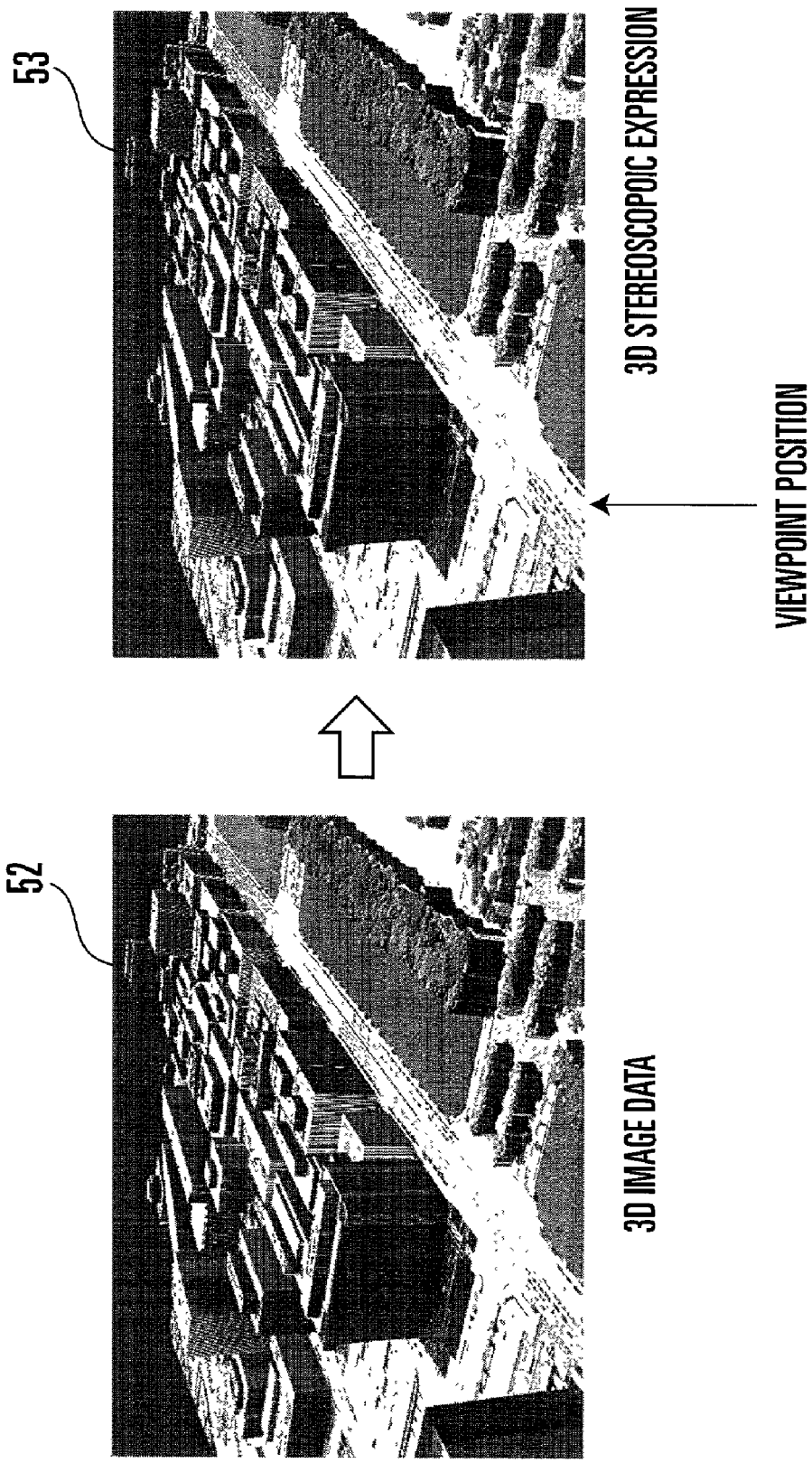
FIG. 6 is a view for explaining the schematic operation of the information search/presentation system in FIG. 1.
Figure 7:
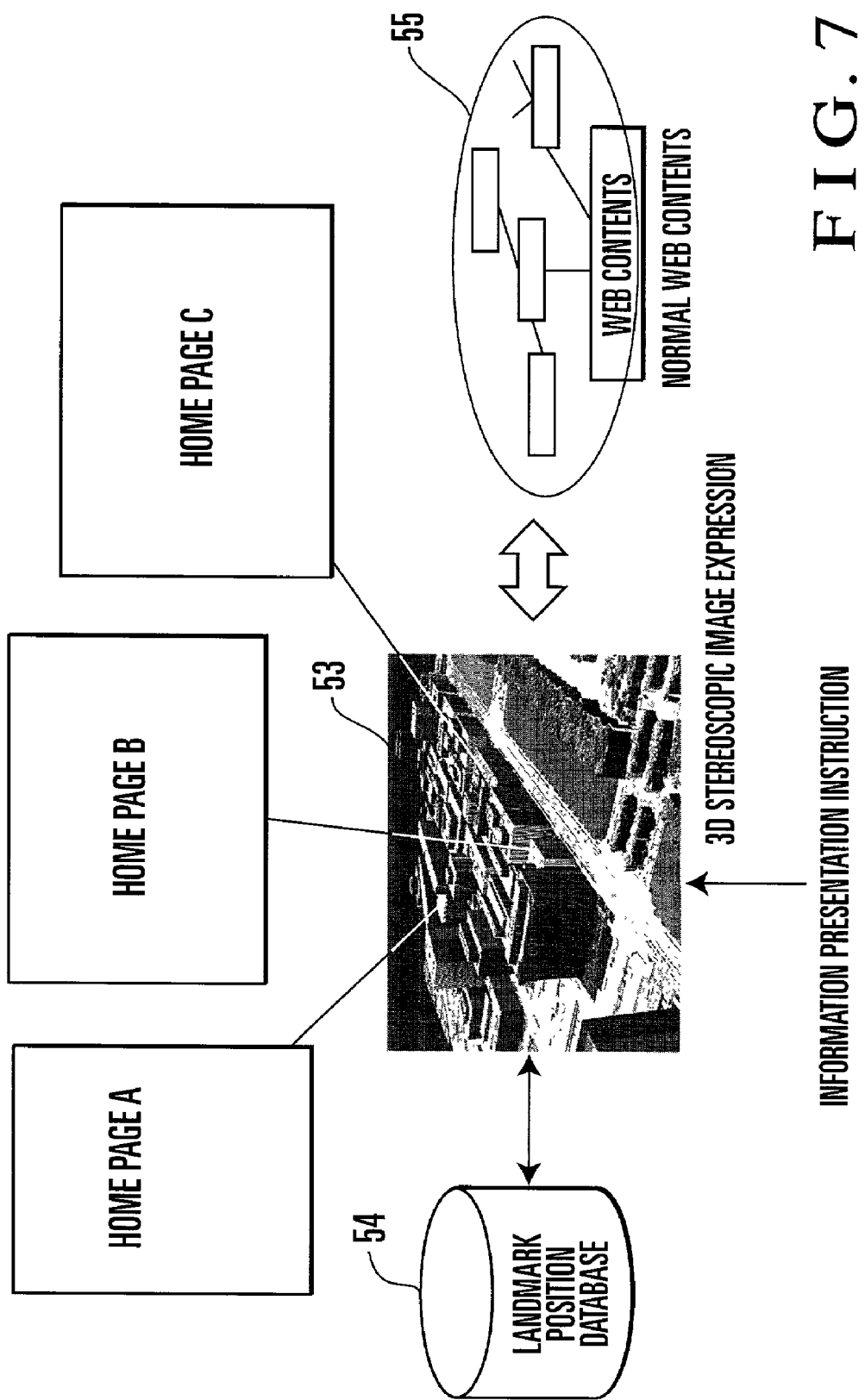
FIG. 7 is a view for explaining the schematic operation of the information search/presentation system in FIG. 1.
Figure 8A:
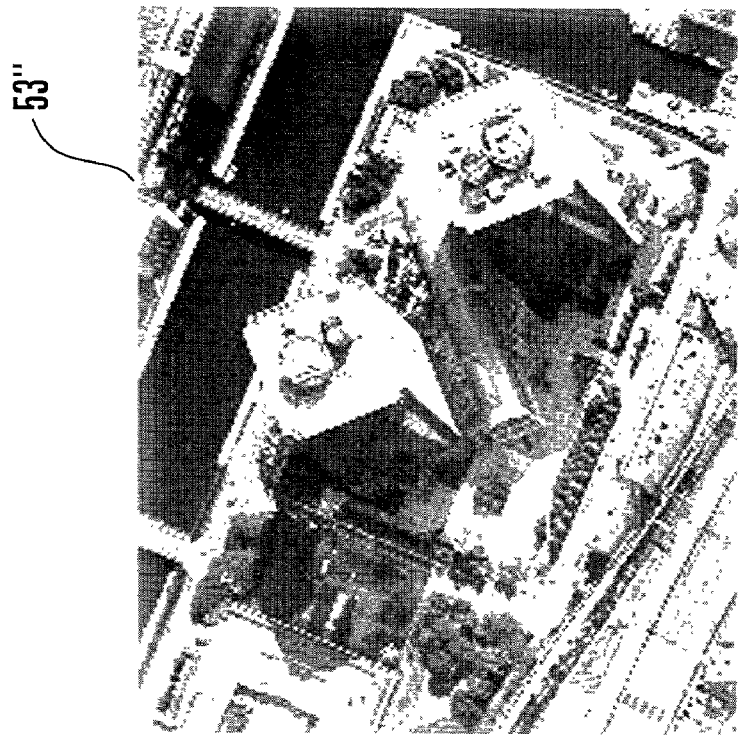
FIGS. 8A and 8B are views showing 3D stereoscopic expressions viewed from different viewpoints.
Figure 8B:
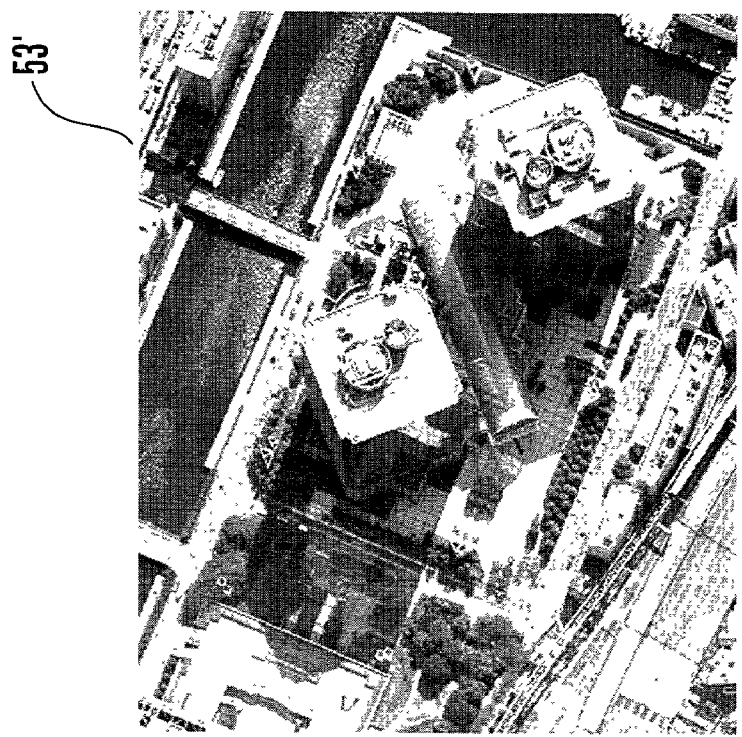

A 3D stereoscopic expression 53 is created by using the 3D image data 52, as shown in FIG. 6, and presented to the user. In this case, a viewpoint position from which the user views is provided for the 3D stereoscopic expression 53. As the viewpoint position changes, as shown in FIGS. 8A and 8B, a 3D stereoscopic expression 53' changes into a stereoscopic expression 53" viewed from a different position. If the viewpoint position is gradually and continuously moved, the 3D image changes from moment to moment as if the user were doing a sight-seeing flight. A technique of creating the 3D stereoscopic expression 53 from the 3D image data 52 has been established as disclosed in, for example, "Automatic generation of high resolution urban zone digital elevation models", ISPRS Journal of Photogrammetry & Remote sensing, pp. 33–47, 1997 (reference 2). The present invention uses such a 3D stereoscopic image creation technique.

Assume that the user designates a specific landmark and generates a request to present associated information during a "sight-seeing flight" in the 3D stereoscopic expression 53. In this case, it is convenient if information associated with the landmark is presented on the Internet. A database 54 is a table in which verbal expressions or keyword sequences indicating the names and contents of landmarks such as buildings are stored in correspondence with position information indicating the locations of the landmarks. If, for example, a landmark is an international exhibition hall A, keywords such as the "full name", "abbreviation", and "address" of the international exhibition hall A are stored in advance. If the landmark is a museum B, the "full name", "special exhibition name", "address", and the like of the museum B are stored in advance.

If the user generates a request to present information associated with a specific landmark, the database 54 is looked up in accordance with the position of the landmark. If the corresponding landmark is stored in the database 54, a verbal expression or keyword sequence representing the name and contents of the landmark is transferred to the search engine 3 for the WWW on the Internet. The search result obtained by the search engine 3 is presented as associated information to the user. A search engine to be used may be a general search engine. However, information can be presented more properly by using a search engine capable of performing more intellectual processing for position information and address information. The user can obtain information associated with the desired landmark from general Web contents 55 on the basis of the link information obtained as the search result.

As described above, according to the present invention, the above two problems can be solved by receiving an input from the user upon presenting map information, and presenting associated information to the user. With regard to the first problem that it takes considerable effort to update map information, since manual operation of creating a map can be replaced with mechanical operation by using artificial satellite images or aerial photographs, map information can be easily updated. If, for example, "IKONOS" is used, image information about the entire surface of the earth can be updated weekly. This makes it possible to present, for example, a scene in which a field that was entirely covered with snow last week has changed to a green field this week. In addition, the condition of a mountain that changes on a weekly basis in the fall can be presented timely. Likewise, changes in weather and condition of a volcanic eruption can be easily informed every day.

In addition, according to the present invention, updated latest information associated with a map can be presented when the user requires it, because a search for information is made independently of the map. For example, weather information and information about volcanoes are presented and updated on the WWW, and hence such latest information can be used when required. According to the conventional method, since associated information is attached to a map in advance, the information must be manually updated to present latest information. This is not practical method in consideration of actual operation. The present invention solves this problem and can always present latest information to the user.

According to the present invention, the second problem that a search for information from a map is not fun for the user can be solved by allowing the user to change a 3D stereoscopic image in real time by changing input information about a viewpoint position. With this operation, the user feels as if he were doing a sight-seeing flight, thus obtaining a visual effect that makes the information search much more fun for the user than when the user simply traces on a 2D map. In addition, as described above, when the user sees a given area, the above technique can express, for example, a scene in which a field that was entirely covered with snow last week has changed to a green field this week with a sense of realism. This further gives the user a lot of pleasure.

Figure 2:
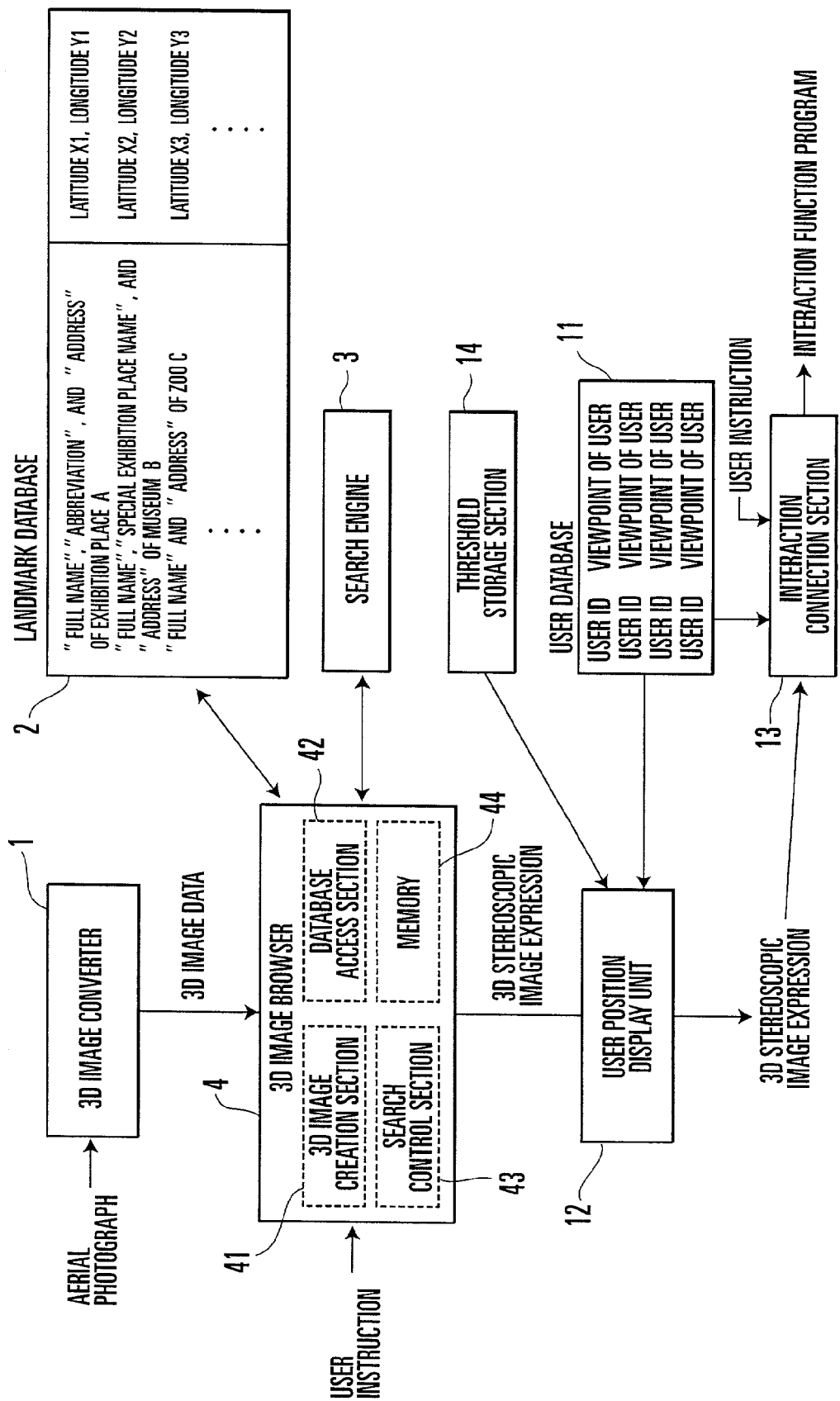
FIG. 2 is a block diagram showing an information search/presentation system according to the second embodiment of the present invention.

FIG. 2 shows an information search/presentation system according to the second embodiment of the present invention. The same reference numerals as in FIG. 1 denote the same parts in FIG. 2, and a description thereof will be omitted. In addition to a 3D image converter 1, landmark database 2, search engine 3, and 3D image browser 4, the information search/presentation system of this embodiment includes a user position display unit 12 for displaying a user position on the basis of the 3D stereoscopic image expression output from the 3D image browser 4, a threshold indicating the maximum number of other users, and the viewpoint position information of the user, a user database 11 for outputting the viewpoint position information of the user to the user position display unit 12, a time storage section 14 for outputting the maximum number of other users to the user position display unit 12, and an interaction connection section 13 for performing interaction connection with another person desired by the user.

The user database 11 stores the current viewpoint position information of all users who are currently logging in to the system. When an information search service using the present invention is to be provided by using the WWW, it is natural that the user database 11 is realized by a relational database. Each user performs a sight-seeing flight on a WWW browser and inputs the current viewpoint position to the WWW browser. This input is transferred to the WWW server and stored in the user database 11 in the relational database from moment to moment.

The user position display unit 12 adds a user position mark indicating the current position of the user to the viewpoint position designated by the user on the 3D stereoscopic image presented to the user by the 3D image browser 4. Subsequently, the viewpoint positions of other users from the user database 11, and other user position marks indicating the current positions of the other users are displayed at the respective viewpoint locations.

It is natural that the user position display unit 12 is realized as an additional function on the WWW browser. In general, this function is realized by a Java applet, ActiveX, or plug-in function. The viewpoint position of the user can be acquired on the WWW browser side. However, when the current position of distant user is to be acquired, the user must issue a request to the WWW server to acquire the current position of a distant user from the user database 11. If an area where the user is to do a sight-seeing flight is as narrow as 1 kilometer square or the total number of users is small, no problem arises in acquiring all the current positions of other users. If, however, the range of a sight-seeing flight covers the entire world or the number of users is very large, only the current positions of other users are returned up to the maximum number of other users stored in the time storage section 14 in the increasing order of distance from the user himself/herself.

When the user designates a specific distant user position mark and generates a request for interaction, the interaction connection section 13 establishes connection for electronic mail, telephone, or chat function with the designated distant user. More specifically, when the user designates a specific distant user mark on the WWW browser, the interaction connection section 13 notifies the WWW server side of the reception of the interaction request, and checks the ID of the distant user. The interaction connection section 13 activates an execution application for a predetermined interaction means such as electronic mail, telephone, or chat function to establish connection.

Whether an interaction is made or rejected on the distant side is determined in the activated execution application, and hence this processing falls outside the range of the present invention.

According to the second embodiment, since the user can see what a distant user is seeing in a sight-seeing flight, the user can know what kind of person is "roaming" what kind of place. This further gives the user a lot of pleasure. Users who are seeing the same place may visit noted places of historic associations or get acquainted with each other as the saying goes "good company makes the road shorter". Assume that the user is seeing a place around the Leonardo Da Vinci Museum at Vinci on the outskirts of Florence in Italy. In this case, another person may appear in this place. In such a case, the user may expect that the person also likes Leonardo Da Vinci, and they may call to each other to start friendship.

Figure 3:
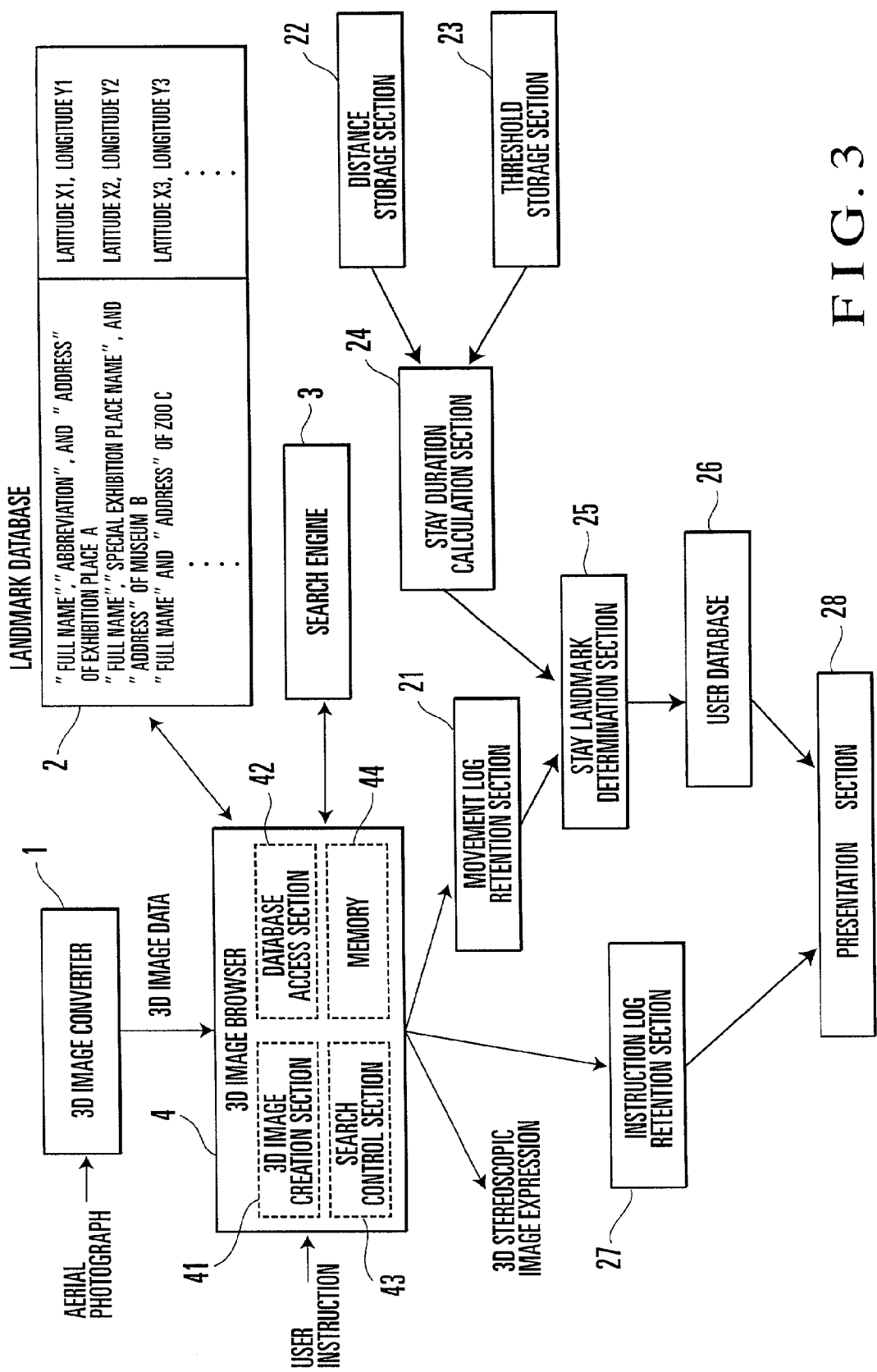
FIG. 3 is a block diagram showing an information search/presentation system according to the third embodiment of the present invention.

FIG. 3 shows an information search/presentation system according to the third embodiment of the present invention. The same reference numerals as in FIG. 1 denote the same parts in FIG. 3, and a description thereof will be omitted. In addition to a 3D image converter 1, landmark database 2, search engine 3, and 3D image browser 4, the information search/presentation system of this embodiment includes a movement log retention section 21 for retaining all movement logs output from the 3D image browser 4, a distance storage section 22 for storing a distance that indicates the range of a landmark area in advance, a time storage section 23 for storing a threshold of a stay duration (flight duration) in advance, a stay duration calculation section 24 for calculating a stay duration (flight duration) in a landmark area on the basis of outputs from the distance storage section 22 and time storage section 23, a stay landmark determination section 25 for determining a landmark at which the user is staying and doing sight-seeing on the basis of outputs from the movement log retention section 21 and stay duration calculation section 24, a user database 26 for storing landmark stay information about the user and adds data from the stay landmark determination section 25 as database information, an instruction log retention section 27 for retaining all information search instruction logs output from the 3D image browser 4, and a presentation section 28 for presenting a research totalizing result on the basis of outputs from the user database 26 and instruction log retention section 27.

The movement log retention section 21 records a pair of the viewpoint position of the user and the corresponding time as a movement log. The distance storage section 22 stores a predetermined radius defining a circle centered on a specific landmark, which is used to determine whether the user is interested in the landmark. Assume that a numerical value of 500 m is stored in the distance storage section 22. In this case, if the user enters a radius of 500 m of a circle centered on a given landmark, it is determined that the user is interested in the landmark.

The time storage section 23 stores a minimum stay duration in which the user stays around a specific landmark in advance, which is used to determine whether the user is interested in the landmark. Assume that a numerical value of 1 min is stored in the time storage section 23. In this case, if the user stays around a given landmark for 1 min or more, it is determined that the user is interested in the landmark. The stay duration calculation section 24 looks up the landmark database 2 to extract the position of a landmark over which the user passed and the time when the user passed over the landmark from the movement logs retained in the movement log retention section 21. The stay duration calculation section 24 calculates the first and last times at which the user is located within the distance range stored in the distance storage section 22 at positions before and after the extracted landmark.

The stay landmark determination section 25 compares the threshold stored in the time storage section 23 with the difference between the first and last times (the stay duration in a predetermined landmark area) calculated by the stay duration calculation section 24. If the difference is equal to or larger than the threshold, it is determined that the user has stayed in the landmark area, and a pair of the landmark name and the difference between the last and first times are added as a unit record to the user database 26. The user database 26 stores the landmarks at which the user has stayed and the stay durations in pairs (landmark stay information).

The instruction log retention section 27 records an information presentation instruction log by recording a pair of the name of a landmark for which the user has issued an instruction to present associated information and the instruction time as a unit record. Upon reception of an instruction to present a totalizing result from a manager, the presentation section 28 outputs all the records in the user database 26 and all the records in the instruction log retention section 27.

Although the stay landmark determination section 25 calculates the difference between the last and first times calculated by the stay duration calculation section 24, i.e., the stay duration in a predetermined landmark, the stay duration calculation section 24 may calculate this and transfer it to the stay landmark determination section 25.

In this arrangement, the landmark stay information about the user is automatically stored in the user database 26, and landmark stay information is presented by the presentation section 28 in association with instruction log information from the instruction log retention section 27.

According to the third embodiment, since all pieces of information indicating when and where each user has visited can be recorded, pieces of information indicating social trends, e.g., indicating what kinds of people gather at what kinds of places, can be totalized. For example, by acquiring all pieces of information, e.g., information indicating how many people went to see the cherry-trees at a point B when (x month, xx day) the cherry-trees were in full blossom and information indicting which places people went after seeing the cherry-trees at the point B, valuable marketing information can be acquired.

Obviously, if the service manager side knows where users roamed while they were identified, users' privacy is invaded, and the users do not want to accept it. Therefore, each user allows the manager side to use the above information with the user's anonymity being protected. This makes it possible for each user to use the system with a feeling of being safe. In practice, various search engines that are currently providing free services on the WWW totalize such pieces of search information and use the totalizing result as marketing information.

As has been described above, according to the present invention, when an input from a user is received upon presentation of map information, and associated information is presented, the above two problems can be solved.

With regard to the first problem that it takes considerable effort to update map information, manual creation of a map can be replaced with mechanical operation by using artificial satellite images or aerial photographs, the map information can be easily updated.

With regard to the second problem that a search for information from a map is not fun, an illusion of a sight-seeing flight can be produced by letting a user change his/her viewpoint position, thus obtaining a visual effect that makes an information search much more fun than when the user simply traces on a map.

What is claimed is:

1. An information search and presentation system comprising:
   a 3D image converter for outputting 3D image data on the basis of a plurality of aerial photographs obtained by photographing a single area from different places, with a physical position of the area being specified;
   a first database for storing a pair of a textual expression and position information as a unit record, the textual expression pertaining to a name and contents of a landmark existing in the area photographed to obtain the aerial photographs;
   a search engine for outputting link information for page data including associated contents from a set of page data on public view in a World Wide Web in response to an input keyword;
   a 3D image browser for creating a 3D stereoscopic image viewed from a viewpoint position designated by a user on the basis of the 3D image data from said 3D image converter and the viewpoint position, presenting the image to the user, looking up said first database in accordance with an associated information presentation request associated with the position designated by the user, and, if a landmark corresponding to the designated position exists, outputting to said search engine the textual expression pertaining to a name and contents of the corresponding landmark as obtained from said first database, as a keyword to be provided as a search term to said search engine to search the World Wide Web;
   a second database for storing user stay information constituted by a pair of a landmark where the user stayed and a stay duration of a user's stay;
   a log retention section for recording a pair of a viewpoint position of the user and a corresponding time as a movement log;
   a time storage section storing a minimum stay duration in a landmark area, in advance, which is used to determine whether the user is interested in a specific landmark;
   a distance storage section storing a distance indicating a range of a landmark area, in advance, which is used to determine whether the user is interested in a specific landmark;
   a stay duration calculation section for extracting a position of a landmark over which the user passed and a corresponding time from movement logs retained in said log retention section by referring to said second database, and calculating a stay duration in the landmark area from first and last times at which a viewpoint position of the user is located within the range indicated by the distance stored in said distance storage section which corresponds to positions before and after the position of the extracted landmark;
   a stay landmark determination section for, when the stay duration output from said stay duration calculation section is not less than the time stored in said time storage section, determining that the user has stayed in the landmark, and adding a unit record constituted by a pair of a landmark name and a stay duration to said second database;
   an instruction log retention section for recording a unit record constituted by a pair of a landmark name for which an associated information presentation instruction is issued by the user and a designated time as an information presentation instruction log; and
   a presentation section for outputting all records in said second database and all records in said log retention section in accordance with a totalizing result presentation instruction.

2. The system according to claim 1, wherein said second database is utilized for recording an ID of the user and a viewpoint position of the user;
   the system further comprising:
   a user position display unit for adding a user position mark indicating a current position of the user to a viewpoint position designated by the user on the 3D stereoscopic image presented by said 3D image browser, extracting a viewpoint position and ID of a distant user from said second database, and presenting the extracted viewpoint position and ID with a distant user position mark indicating the position of the distant user being added; and an interaction connection section for, when the user generates a request for interaction by designating a specific distant user position mark, performing interaction connection upon regarding an ID of a distant user corresponding to a current position of the designated distant user position mark.

3. A system according to claim 2, wherein
said system further comprises a storage section storing the maximum number of distant users, in advance, which indicates the maximum number of current positions of distant users which are to be displayed; and said user position display unit extracts viewpoint positions and IDs of distant users from said second database by a number equal to the maximum number stored in said storage section in increasing order of distance from the current position of the user, and presenting the extracted viewpoint positions and IDs, with distant user position marks indicating the positions of the distant users being added.

4. A system according to claim 2, wherein said interaction connection section activates an interaction function program in making connection to a distant user.

5. A system according to claim 4, wherein the interaction function program comprises a program for performing interaction connection by using a selected one of electronic mail, telephone, and electronic chat functions.

6. A system according to claim 1, wherein said 3D image browser comprises:

a 3D image creation section for creating a 3D stereoscopic image viewed from a viewpoint position designated by the user on the basis of 3D image data from said 3D image converter and the viewpoint position;

a database access section for accessing said database in accordance with an associated information presentation request associated with the viewpoint position designated by the user; and a search control section for, when an access result indicates that a landmark corresponding a designated position exists, outputting to said search engine a textual expression pertaining to a name and contents of the corresponding landmark as a keyword, and presenting a search result output from said search engine.

7. A system according to claim 1, wherein, when the stay duration output from said stay duration calculation section is not less than the time stored in said time storage section, the unit record constituted by the landmark name is stored in the first database if the landmark name has not been previously stored in the first database, the landmark name being stored together with position information of a landmark corresponding to the landmark name.

8. A system according to claim 1, wherein the stay duration stored in the second database corresponds to a virtual stay duration of the user visiting the landmark via a computer accessing a particular network location corresponding to a virtual implementation of the landmark.

* * * * *